United States Patent [19]

Sweeney

[11] Patent Number: 4,534,315

[45] Date of Patent: Aug. 13, 1985

[54] ANIMAL LITTER CONTAINER

[75] Inventor: William J. Sweeney, Westfield, N.J.

[73] Assignee: Engelhard Corporation, Iselin, N.J.

[21] Appl. No.: 527,123

[22] Filed: Aug. 29, 1983

[51] Int. Cl.³ .................... A01K 29/00; A01K 1/035
[52] U.S. Cl. ..................................................... 119/1
[58] Field of Search ........................................... 119/1

[56] References Cited

U.S. PATENT DOCUMENTS

| | | | |
|---|---|---|---|
| 3,684,155 | 8/1972 | Smith | 119/1 |
| 3,752,121 | 8/1973 | Brazzell | 119/1 |
| 3,965,863 | 6/1976 | Scott | 119/1 |
| 4,308,825 | 1/1982 | Stepanian | 119/1 |
| 4,359,966 | 11/1982 | Casino | 119/1 |

FOREIGN PATENT DOCUMENTS 2737617  3/1979  Fed. Rep. of Germany .......... 119/1

Primary Examiner—Robert P. Swiatek
Assistant Examiner—Kris R. Schulze
Attorney, Agent, or Firm—Victor E. Libert

[57] ABSTRACT

An animal litter container has a receptacle containing a lower layer of moisture-absorbent material covered by a liquid-permeable upper layer of particulate material which is relatively moisture-impervious. The lower layer may be segregated from the upper layer by a liquid-permeable barrier effective to reduce the emanation of odors from the lower layer.

8 Claims, 5 Drawing Figures

U.S. Patent   Aug. 13, 1985   4,534,315
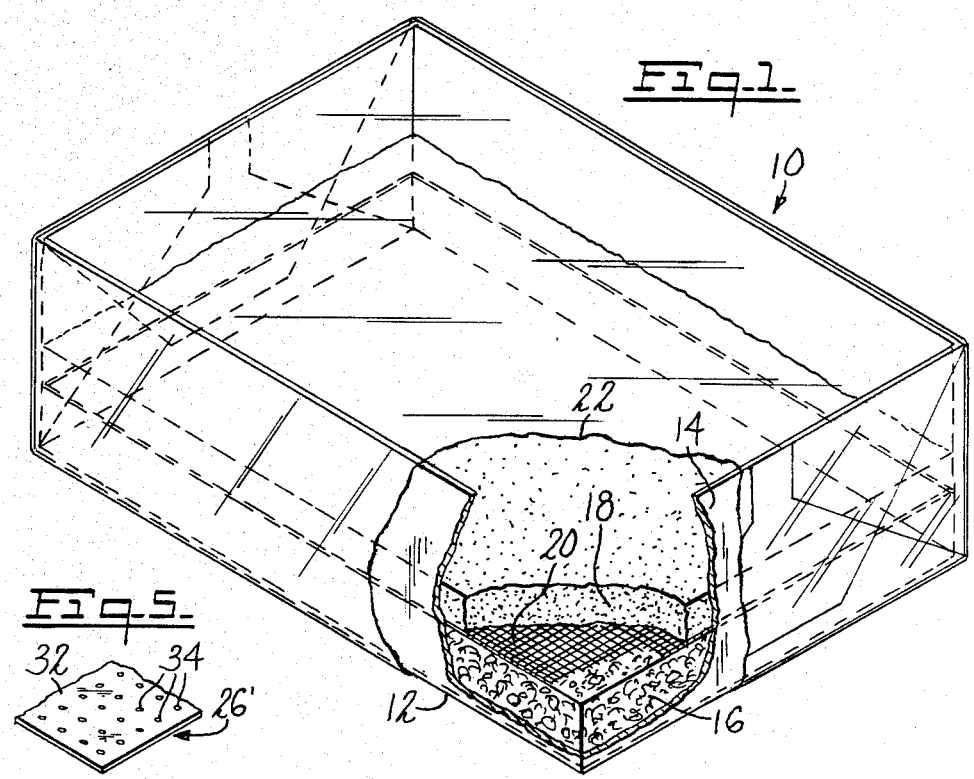
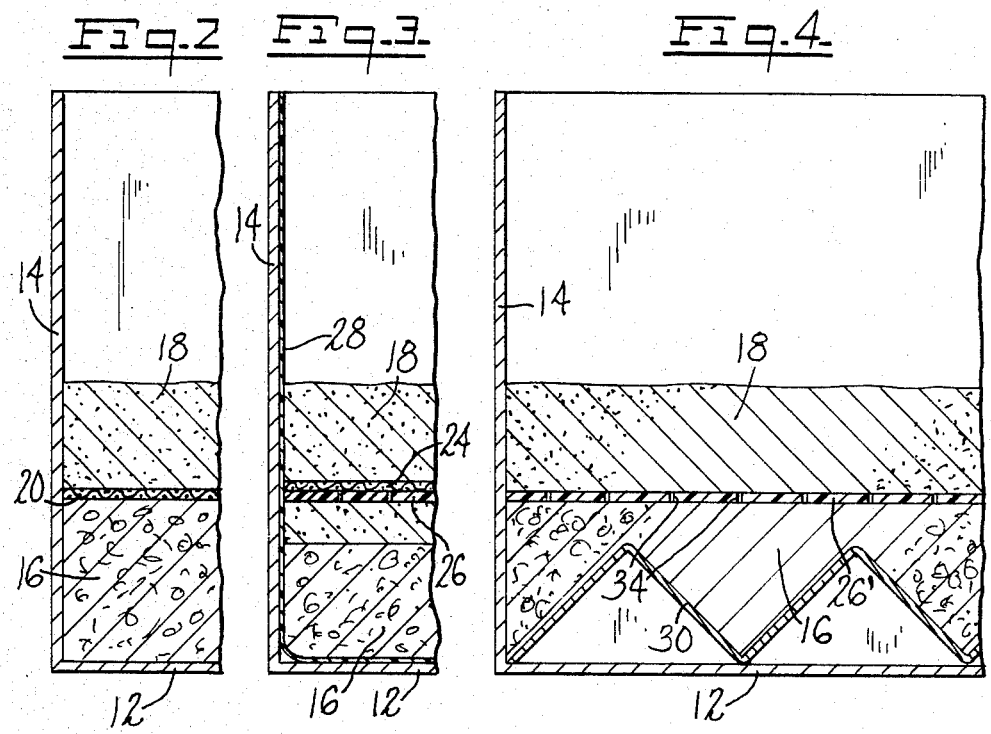

ANIMAL LITTER CONTAINER

BACKGROUND OF THE INVENTION

This invention relates generally to animal litter containers of the type containing loose partiulate material therein, such as so-called "litter boxes", which are well suited for household use by domestic pets, such as cats, to deposit their excreta therein.

Such litter boxes are, of course, well known to the art. For example, U.S. Pat. No. 4,271,787 discloses a plurality of self-contained, disposable feline litter boxes housed in stacked relation within a container. Each litter box includes a removable top cover to expose the litter material contained within respective boxes. As each litter box is soiled, it may be removed from the container and disposed of, thereby exposing the next one for use.

U.S. Pat. No. 3,978,818 discloses a litter container containing a body of litter within a container of waterproof material and enclosed by an outer wrapper which may be opened to expose the open-top, substantially rectangular container for use.

U.S. Pat. No. 3,284,273 discloses an absorbent pad for use as a floor covering to absorb dripped or spilled liquids, and generally provides spaced-apart upper and lower layers within which is contained a liquid-retaining material which may be a sheet material or a granular material such as grains of absorbent clay. At least the upper layer is made of a liquid-permeable material, such as felt, so that liquids impinging thereon will pass therethrough and be absorbed by the intermediate liquid-retaining layer. The patent discloses that the lower layer may be lined with a liquid barrier material.

U.S. Pat. No. 4,173,046 discloses an absorptive and protective underpad for human patients utilizing a top cushioning layer which is perforated to admit liquids therethrough and a lower absorbent layer which will permit liquid flow into the absorbent layer and reduce to a minimum the generation and release of offensive odors from the absorbent layer.

One difficulty with many of the prior art animal litter devices, which utilize particulate litter material, is that the deposit of waste material tends to cause the litter to become foul-smelling and prompts the replacement of the entire box of litter after only limited use. Some of the prior art devices attempt to overcome this problem by providing, in lieu of particulate litter material, layers of absorbent fabric-like material which may be individually removed to expose fresh layers beneath, as may be seen in U.S. Pat. 4,250,834. However, these devices usually provide a hard, perforated platform on which the animal stands. Not only do such devices fail to adequately accomodate solid waste, but domestic animals such as cats are disinclined to use such litter boxes as they instinctively desire to cover up their waste and therefore favor litter boxes containing particulate material which they can paw to cover the deposited waste.

SUMMARY OF THE INVENTION

Generally, the present invention provides an animal litter container comprising a top layer of a relatively liquid-impervious particulate material which the animal can paw and utilize to cover the deposited waste, disposed over a lower layer of a highly moisture-absorbent material. A liquid-permeable barrier means may be disposed between the upper and lower layers in order to prevent the animal from disturbing the lower moisture-absorbent layer by pawing and/or to reduce the emanation of odors from the lower layer.

In accordance with the present invention, there is provided an animal litter container comprising a receptacle containing a lower layer of moisture-absorbent material covered by a liquid-permeable upper layer of particulate material which is relatively moisture-impervious as compared to the moisture-absorbent material.

In another major aspect of the invention, a liquid-permeable barrier means is provided and is positioned to segregate the lower layer from the upper layer. The barrier means may comprise a foraminous material and may also serve as an odor abatement means, and be positioned between the lower layer and the top of the upper layer to reduce the emanation of odors from the lower layer.

In its perferred aspects, the invention may have one or more of the following features, singly or in combination: the odor abatement means may comprise a liquid and vapor-impermeable material which is perforated and thereby rendered liquid-permeable, while serving to reduce the emanation of odorous vapors; the moisture-absorbent material in the lower layer may comprise a particulate absorbent clay, and the relatively moisture-impervious material of the upper layer may be sand, or the like.

In other aspects of the invention, the receptacle may comprise a bottom and peripheral sidewalls extending from the bottom to above the top of the upper layer, and may further include a moisture-barrier lining the bottom of the receptacle and the peripheral sidewalls and extending up to at least the top of the upper layer.

The bottom of the receptacle may be of a corrugated configuration whereby the volume of moisture-absorbent material required to fill the receptacle to a given depth is reduced.

The container may be wrapped in a removable moisture-barrier wrapping means for sealing the receptacle contents prior to the use of the container.

BRIEF DESCRIPTION OF THE DRAWINGS

FIG. 1 is a perspective view of one embodiment of an animal litter container in accordance with the present invention, with a portion thereof cut-away for clarity of illustration;

FIG. 2 is an enlarged cross-section view in elevation of a portion of the animal waste container shown in FIG. 1;

FIG. 3 is a view corresponding to that of FIG. 2 but showing a portion of a second embodiment of the invention;

FIG. 4 is an enlarged cross-section view in elevation showing a portion of a third embodiment of the invention; and FIG. 5 is a perspective view of a portion of an odor abatement means in accordance with the present invention.

DESCRIPTION OF THE PREFERRED EMBODIMENTS

The animal litter container illustrated in perspective in FIG. 1 and in cross-section in FIG. 2 is seen to comprise a receptacle 10 having a bottom 12, and upstanding peripheral sidewalls 14. The lateral dimensions of bottom 12 of the receptacle are sufficiently large to permit a domestic animal, such as a cat, to stand thereon. The sidewalls 14 are of a height sufficiently low to permit the animal to conveniently step over the sides and into the box, and are sufficiently high to reduce the displacement of a particulate material contained in the receptacle 10 over the sidewalls 14 and out of the receptacle 10, by the normal pawing of the animal.

A lower layer 16 of moisture-absorbent material is contained within the receptacle 10 and is covered by a liquid-permeable upper layer 18 of particulate moisture-impervious material.

A liquid-permeable barrier means 20 is positioned between the layers 16, 18, to segregate the lower layer 16 from the upper layer 18.

A removable moisture-barrier wrapper 22 is wrapped around the receptacle 10 and seals the contents against spillage during storage and shipment, as well as protecting lower layer 16 against moisture. For storage and shipment, packing means (not shown) may be placed within receptacle 10 atop upper layer 18 to retain the particulate contents (the material of upper layer 18) in place. For example, a folded cardboard filler or a styrofoam block, which is sized to fill the volume of receptacle 10 not taken up by layers 16 and 18, may be wrapped within wrapper 22 and discarded when the wrapper 22 is removed and the device is placed into use.

The upper layer 18 may comprise and suitable particulate material which will permit the liquid to pass readily therethrough and into contact with the lower, absorbent layer 16. The individual particles of which the upper layer 18 is constituted should be relatively liquid-impervious so that they do not absorb significant amounts of the liquid, i.e., animal urine, deposited upon the upper layer 18. This is because retention of a significant proportion of the urine in the upper layer 18 would lead to the emanation of odors. Accordingly, the upper layer 18 may be comprised of common sand, a fine gravel or the like, or even glass beads, ceramic or plastic chips or the like. As used herein and in the claims, the term "sand" is intended to be broadly construed to comprise common sand, a fine gravel or the like. Generally, any particulate material of a size to permit it to be readily pawed by a domestic animal such as a cat, having the requisite relative imperviousness to liquids in general and to animal urine in particular, and which is non-toxic, is suitable.

A deodorant and/or perfume additives may be incorporated into upper layer 18 and/or into lower layer 16. As lower layer 16 is not accessible to the animal, it is not necessary to rule out for use therein additives which might irritate the animal's feet.

The material of the lower layer 16 may comprise any nontoxic moisture-absorbent material, such as any absorbent clay, fuller's earth, bentonite, diatmaceous clay or the like, and is preferably provided in the form of particles, such as pellets, granules or irregularly shaped particles. The animal urine which passes through the upper layer 18 is absorbed by the highly absorbent lower layer and retained therein. A particularly useful highly absorbent material for utilization as the material of the lower layer 16 has been found to be activated attapulgite clay, which is a relatively inexpensive, highly absorbent clay. Accordingly, activated attapulgite clay is a preferred material for the lower absorbent layer 16.

While it is desired that the animal be free to paw the upper layer 18 of particulate material to enable it to cover solid waste deposited in the litter container, it is also desired that the lower absorbent layer 16 not be disturbed in order to prevent the loss of absorbent material and to prevent the animal from exposing the urine-soaked absorbent material. Accordingly, a barrier means 20 is provided between the upper layer 18 and the lower layer 16.

Barrier means 20 is coextensive with the bottom 12 of the receptacle 10 and is positioned between the two layers 16, 18 so that it serves to hold the absorbent material in the lower layer 16 in position beneath the upper layer 18. It comprises a foraminous or perforated material, such as a screen, which is liquid-permeable to allow the passage of animal urine to the lower layer 16.

Barrier means 20 may be fastened to the sidewalls 14 by any convenient method such as by any suitable adhesive or mechanical fastener or support to hold the lower layer 16 in its proper position not only during shipment and handling but also in use, thereby to prevent mixing of the two layers 16, 18.

The receptacle 10 preferably comprises a moisture-resistant rigid or semi-rigid material which will not deteriorate significantly due to contact with animal urine during the useful life of the litter container. Suitable materials for the construction of the receptacle 10 are plastic, coated cardboard, fiberboard, wood and the like. In the preferred embodiment, the animal litter container is entirely disposable. Materials which have been found to be suitable for the construction of a disposable litter container are: sand for the upper layer 18; activated attapulgite clay for the lower layer 16; plastic coated or plastic-lined cardboard for the receptacle 10; and a screen for the barrier means 20. Other suitable inexpensive materials which meet the requirements outlined above may also be utilized in the construction of a disposable animal litter container.

Wrapper 22 may be formed from any flexible wrapping material, and preferably one which is resistant to the passage of moisture therethrough. A suitable material is clear plastic film which has some moisture barrier properties.

To place the litter container in use, wrapper 22 is removed and discarded and, if a filler means such as a styrofoam or cardboard filler has been used, it, too, is removed and discarded to expose the particulate material of the upper layer 18. The use of a particulate material in the upper layer facilitates the training of a domestic animal, such as a cat, to use the litter container because it may then cover its waste in accordance with its natural instincts.

In use, the animal steps over the sidewalls and stands upon the upper layer 18 so that liquid animal waste passes through the liquid-permeable upper layer 18, through the liquid-permeable barrier means 20 and into the lower layer 16 where it is trapped by the absorbent material therein. The moisture-impervious material in the upper layer 18 also functions as an odor barrier which helps reduce the passage of odors out of the lower layer 16.

Solid animal waste is retained in the upper layer 18 where it may be covered with the liquid-impervious particulate material by the normal pawing of the animal.

Referring now to FIG. 3, a second embodiment of the invention can be seen. In this embodiment, the barrier means is located entirely above the lower layer 16 and below the top of the upper layer 18, but it is not positioned exactly at the interface between the two layers 16, 18. This configuration prevents urine-soaked material in the lower layer 16 from becoming directly exposed to the air even if the upper layer 18 is displaced by the animal to the level of the barrier means.

In this embodiment, the barrier means comprises two parts. The upper part comprises a liquid-permeable foraminous material 24, such as a screen, as previously described, and the lower part comprises an odor abatement means 26 which is effective to reduce the emanation of odors out of the lower layer 16.

The odor abatement means 26 is preferably made of any suitable liquid and vapor-impermeable material and has perforations 34 which render it liquid-permeable while the unperforated portions resist the passage of vapors. The perforations allow liquid animal waste to pass through the odor abatement means 26 under the influence of gravity and yet the small size of the openings therein, in conjunction with the upper layer 18, substantially reduces the emanation of odors from the lower layer 16. The screen 24 serves to protect the odor abatement means 26, which may be a thin plastic film, from damage due to normal pawing of the animal.

FIG. 3 also shows the use of a moisture-barrier 28 lining the inner side of the receptacle 10. The moisture barrier 28 covers the bottom 12 of the receptacle 10 and extends to the top of the sidewalls 14. The use of the moisture-barrier 28 permits the receptacle 10 to be constructed of relatively inexpensive materials, such as cardboard, which are not moisture-resistant. A suitable material for the moisture-barrier 28 is a plastic film.

Referring to FIG. 4, a third embodiment of the invention can be seen. In this embodiment, the barrier means comprises an odor abatement means 26' as previously described. In the embodiment shown in FIG. 3, the screen 24 serves to protect the odor abatement means 26, which may be constructed of a relatively lightweight perforated plastic film, against damage by the normal pawing of the animal. In the embodiment shown in FIG. 4, the odor abatement means 26' may be constructed of a more durable perforated material than that of the FIG. 3 embodiment, and consequently serves both as a barrier means and an odor abatement means. For example, odor abatement means 26' may comprise any material which is sufficiently strong to resist rupture by the pawing of the animal, e.g., means 26' may be an extruded or molded plastic board. As such, it does not require a protective screen 24.

The embodiment shown in FIG. 4 also includes a corrugated bottom 30. This construction enhances mechanical strength and reduces the quantity of absorbent material required to fill the lower layer 16 to a given depth.

FIG. 5 is a perspective view of a portion of the combined odor abatement means-barrier means 26' shown in FIG. 4. It comprises a material such as a plastic sheet or film 32 which is both liquid and vapor-impermeable, and which has been perforated with a plurality of holes 34 thereby rendering the material liquid-permeable.

Perforated sheet 26 or 26' may be formed with caplike depressions in order to facilitate the flow of liquid through perforations 34. Perforations 34 may be of any convenient size but should be significantly larger in diameter than the particles of the upper layer 18 in order to avoid plugging of perforations 34 by individual particles of the upper layer 18. The particles of upper layer 18 are preferably not so fine that they will tend to blow out of receptacle 10 or be excessively tracked out by the animal.

While the invention has been described in detail with respect to specific preferred embodiments thereof, it will be apparent to one skilled in the art that numerous variations may be made to such embodiments without departing from the spirit and scope of the invention.

What is claimed is:

1. An animal litter container comprising (a) a receptacle containing a lower layer of moisture-absorbent solid material covered by a liquid-permeable upper layer of moisture-impervious particulate material, the upper layer being coextensive with and contiguous to the lower layer, and (b) a foraminous liquid-permeable barrier means disposed coextensively with the upper layer and lower layer and positioned between the lower layer and the top of the upper layer, said barrier means comprising an odor abatement means comprised of a liquid and vapor-impermeable material which is perforated and thereby rendered liquid-permeable, and is effective to reduce the emanation of odors from the lower layer.

2. The litter container of claim 1 wherein the moisture-absorbent material in the lower layer comprises a particulate absorbent clay.

3. The litter container of claim 1 wherein the relatively moisture-impervious material of the upper layer is sand.

4. The litter container of claim 1 wherein the receptacle comprises a bottom and peripheral sidewalls extending therefrom to above the top of the upper layer, and further including a moisture-barrier lining the bottom of the receptacle and the peripheral sidewalls thereof and extending up to at least the top of said upper layer.

5. The litter container of claim 4 further comprising a removable, moisture-barrier wrapping means thereon for sealing the receptacle contents prior to use of the container.

6. The litter container of claim 1 wherein the receptacle includes a bottom which is of imperforate corrugated configuration and the lower layer comprises particulate material disposed on top of the corrugated bottom whereby the volume of moisture-absorbent material required to fill the receptacle to a given depth is reduced.

7. The litter container of claim 1 further comprising a receptacle having a bottom and peripheral sidewalls and containing therein the lower layer and upper layer, the receptacle being dimensioned and configured so as to permit an animal to enter therein and stand upon the upper layer of material.

8. The litter container of claim 1 further including a moisture-barrier material lining the bottom and peripheral sidewalls thereof and extending to at least the top of said upper layer, said barrier material comprising a separate, plastic film liner.

* * * * *